US008013062B2

(12) United States Patent
Ruzette et al.

(10) Patent No.: US 8,013,062 B2
(45) Date of Patent: Sep. 6, 2011

(54) METHOD OF PRODUCING AND USING MATERIALS WHICH ARE REINFORCED AGAINST IMPACT AND WHICH CONTAIN BLOCK COPOLYMERS THAT ARE OBTAINED BY MEANS OF CONTROLLED RADICAL POLYMERIZATION IN THE PRESENCE OF NITROXIDES

(75) Inventors: Anne-Valerie Ruzette, Paris (FR); Florence Chauvin, Marseille cedex (FR); Olivier Guerret, La Tour de Salvagny (FR); Denis Bertin, Marseille (FR); Bruno Vuillemin, Lescar (FR); Ludwik Leibler, Paris (FR); Pierre Gerard, Denguin (FR); Yannick Ederle, Paris (FR)

(73) Assignee: Arkema France, Colombes (FR)

( * ) Notice: Subject to any disclaimer, the term of this patent is extended or adjusted under 35 U.S.C. 154(b) by 861 days.

(21) Appl. No.: 10/502,216

(22) PCT Filed: Jan. 21, 2003

(86) PCT No.: PCT/FR03/00186
§ 371 (c)(1),
(2), (4) Date: Nov. 16, 2005

(87) PCT Pub. No.: WO03/062293
PCT Pub. Date: Jul. 31, 2003

(65) Prior Publication Data
US 2006/0063891 A1    Mar. 23, 2006

(30) Foreign Application Priority Data

Jan. 22, 2002  (FR) ..................................... 02 00814
Feb. 13, 2002  (FR) ..................................... 02 01765

(51) Int. Cl.
*C08L 53/00* (2006.01)
*C08L 53/02* (2006.01)
(52) U.S. Cl. ..... 525/71; 525/92 R; 525/92 B; 525/92 L; 525/92 E; 525/94; 525/98
(58) Field of Classification Search .............. 525/330.3, 525/71, 92 R, 92 B, 92 E, 92 L, 94, 98
See application file for complete search history.

(56) References Cited

U.S. PATENT DOCUMENTS 4,473,683 A * 9/1984 Coran et al. ................... 525/78
4,581,429 A     4/1986 Solomon et al.
4,999,403 A * 3/1991 Datta et al. ................... 525/322
5,677,387 A    10/1997 Bayard et al.
5,686,534 A    11/1997 Bayard et al.
5,756,605 A     5/1998 Moad et al.
5,763,548 A     6/1998 Matyjaszewski et al.
6,239,226 B1 * 5/2001 Fischer et al. ................ 525/256
6,291,620 B1    9/2001 Moad et al.
6,512,060 B1    1/2003 Matyjaszewski et al.
6,541,080 B1    4/2003 Pies
6,624,306 B2    9/2003 Nesvadba et al.
6,646,079 B2   11/2003 Guerret et al.
6,657,043 B1 * 12/2003 Guerret et al. ................ 528/422
2002/0040117 A1   4/2002 Guerret et al.
2002/0193538 A1  12/2002 Matyjaszewski et al.
2003/0065184 A1   4/2003 Nesvadba et al.

FOREIGN PATENT DOCUMENTS

| DE | 101 13 209 | 9/2001 |
| EP | 0 947527 | 10/1996 |
| EP | 1142913 | 10/2001 |
| FR | 2 807 439 | 10/2001 |
| JP | 2000-198825 | 7/2000 |
| WO | WO 96/24620 | 8/1996 |
| WO | WO 98/52978 | * 11/1998 |
| WO | WO 00/71501 | * 11/2000 |

OTHER PUBLICATIONS

Translation of "Polymerization in the Presence of a β-Substituted Nitroxide Radical," WO 96/24620 A1, submitted in IDS dated Jul. 21, 2004.

* cited by examiner

*Primary Examiner* — Jeffrey Mullis
(74) *Attorney, Agent, or Firm* — Smith, Gambrell & Russell, LLP

(57) ABSTRACT

The invention relates to the production and use of block copolymers which are obtained by means of controlled radical polymerization in the presence of nitroxides for the purpose of reinforcing fragile polymer matrices. The invention offers advantages such as (i) simplicity of copolymer synthesis and use and (ii) fine dispersion of the copolymer molecules in the fragile matrix, which ensures both the transparency of the material and high reinforcement against impact. More specifically, the invention relates to the radical synthesis of block copolymers comprising at least three blocks, which include one block having a glass transition temperature of less than 0° C. and a thermoplastic end block having a glass transition temperature of more than 0° C., thereby guaranteeing compatibility with the fragile matrix to be reinforced against impact.

22 Claims, 1 Drawing Sheet

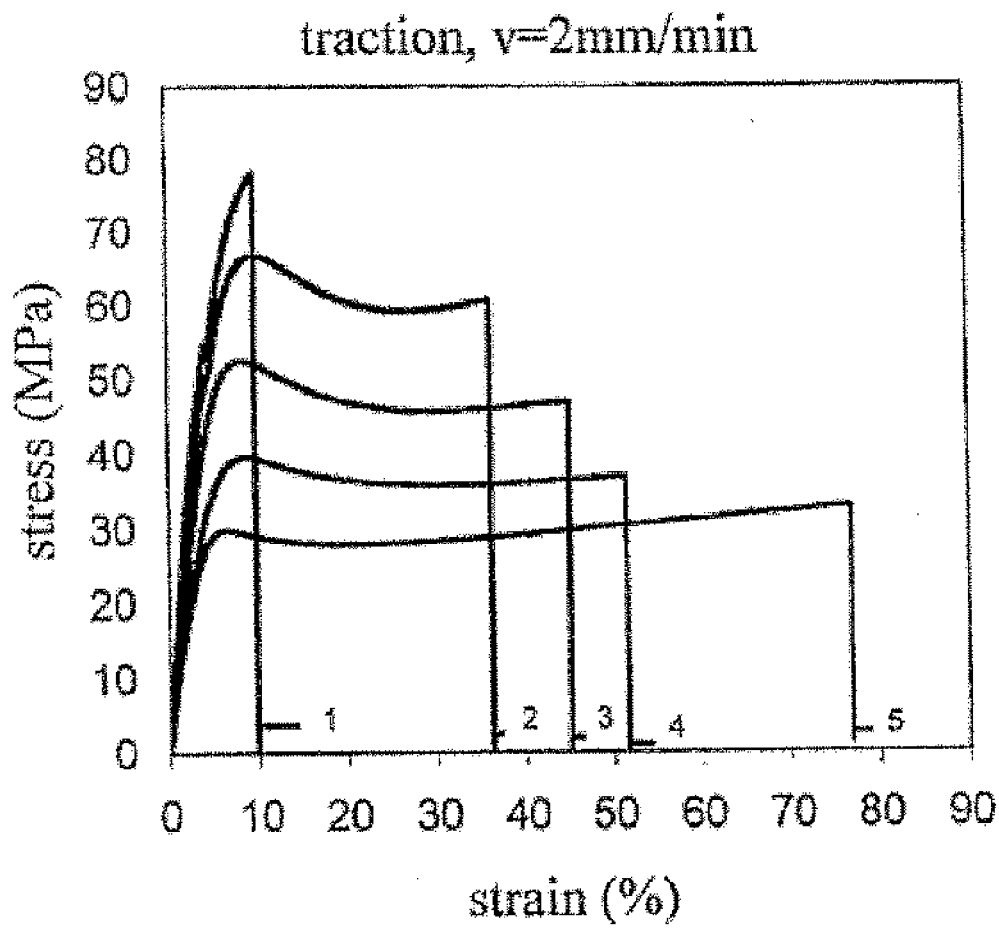
Figure 1 : Traction-elongation test
Key:
(1)    Black, V825 (conventional PMMA matrix)
(2)    Blue, 25% of Flopil 9
(3)    Red, 50% of Flopil 9
(4)    Green, 75% of Flopil 9
(5)    Pink, 100% of Flopil 9

METHOD OF PRODUCING AND USING MATERIALS WHICH ARE REINFORCED AGAINST IMPACT AND WHICH CONTAIN BLOCK COPOLYMERS THAT ARE OBTAINED BY MEANS OF CONTROLLED RADICAL POLYMERIZATION IN THE PRESENCE OF NITROXIDES

FIELD OF THE INVENTION

The present invention relates to the field of materials reinforced against impacts and particularly to materials which are both transparent and reinforced against impacts and more particularly to materials reinforced against impacts using a block copolymer.

BACKGROUND OF THE INVENTION

The present invention discloses the preparation and the use in brittle thermoplastic polymer matrices of block copolymers obtained by controlled radical polymerization in the presence of stable nitroxides, the materials thus obtained exhibiting improved properties of impact strength.

Impact-resistant thermoplastic resins are conventionally obtained by hot blending an impact-reinforcing additive, resulting from the stages of coagulating, dehydrating and drying an elastomer latex, with the particles of the "hard" polymer or thermoplastic resin, which results in what is known as an alloy, from which it is possible to obtain articles shaped by extrusion, injection molding or compression.

SUMMARY OF THE INVENTION

Applicant has just found a novel class of polymer materials which are both transparent and impact-resistant and a novel way of preparing impact-resistant polymer materials.

BRIEF DESCRIPTION OF THE DRAWINGS

FIG. 1 shows the results of the traction-elongation test.

DETAILED DESCRIPTION OF THE INVENTION

The first subject matter of the present invention is transparent and impact-resistant polymer materials composed of a brittle matrix (I), representing from 0 to 95% by weight of the total weight of the materials of the invention, in which is dispersed a block copolymer (II) of general formula B-(A)$_n$. Advantageously, the portion of the brittle matrix is between 10 and 85% by weight.

The materials of the invention can additionally comprise other impact-reinforcing additives, such as those of the Durastrength™ or Metablend™ trade mark, and the like. Generally, the brittle matrix (I) exhibits a glass transition temperature (Tg) of greater than 0° C. Mention may in particular be made, among brittle matrices which it is important to reinforce against impacts, of materials based on poly(methyl methacrylate), on polystyrene, on poly(vinylidene fluoride), on polyesters, on polycarbonate, on poly(vinyl chloride), on polyamide, on polyepoxide, on polyethylene or on polyacrylonitrile, or their copolymers. The brittle matrix is preferably a polymethacrylate.

The block copolymers of the invention correspond to the general formula B-(A)$_n$, n being a natural number of greater than two, preferably between 2 and 20 and preferably between 2 and 8; where B represents a polymer block composed of the sequence of monomer units which can be polymerized by the radical route, the overall Tg of which is less than 0° C. The average molar mass of the block B is greater than 5000 g/mol, preferably greater than 20 000 g/mol and more preferably still greater than 50 000 g/mol.

A is a polymer block composed of a sequence of monomer units which can be polymerized by the radical route, the overall Tg of which is greater than 0° C. The average molar mass of each block A is between 10 000 g/mol and 10$^6$ g/mol, preferably between 10 000 g/mol and 200 000 g/mol and preferably between 20 000 and 100 000 g/mol.

The relative lengths of the blocks A and B are chosen such that n*Mn(A)/(n*Mn(A)+Mn(B)) is between 0.5 and 0.95, preferably between 0.6 and 0.8, and such that Mn(B) is greater than or equal to the mean entanglement length of the block B, where Mn denotes the number-average molecular mass of the polymer.

According to the invention, the block copolymer (II) exhibits a polydispersity index of between 1.5 and 3, advantageously of between 1.8 and 2.7 and preferably of between 1.9 and 2.5. On the other hand, the block B exhibits a polydispersity index of less than 2.

Generally, A represents at least 50% by weight of the total weight of the copolymer (II) and preferably between 60 and 95%.

In particular, B is a polyacrylate with a glass transition temperature of less than 0° C.; preferably, B will comprise butyl acrylate units. A is a polymer compatible with the matrix to be reinforced. By way of indication, in order to reinforce poly(methyl methacrylate) (PMMA), poly(vinylidene fluoride) (PVDF) or poly(vinyl chloride) (PVC), PMMA will be chosen for A. In order to reinforce polyesters, such as poly(butylene terephthalate) or poly(ethylene terephthalate), or epoxys, A will preferably be chosen from polymethacrylates comprising glycidyl methacrylate or methacrylic acid units and, in order to reinforce polystyrene, PS will preferably be chosen for A.

Another subject-matter of the invention is a process for the preparation of the transparent and impact-resistant materials of the invention. This process is based on the "controlled radical polymerization" polymerization technique based on the use of stable nitroxides. The general synthetic scheme is as follows: in a first step, the block B, with a flexible or elastomeric nature, is prepared by polymerization in the presence of a well chosen nitroxide and, in a second step, by using the block B as polymerization initiator, the branches A, with a stiff or thermoplastic nature, are prepared.

It is known that stable nitroxides can result in the formation of block copolymers by controlled radical polymerization (WO 9624620, WO 2000071501 A1 20001130, EP 1142913 A1 20011010). By virtue of certain families of nitroxides described in the abovementioned patents, block copolymers incorporating units as difficult to control by the conventional radical route as acrylates are described. In the case of methacrylates, certain limitations well known to a person skilled in the art appear, such as the transfer reaction with the nitroxide (eq. 1), which brings about a premature loss in the control of the polymerizations:

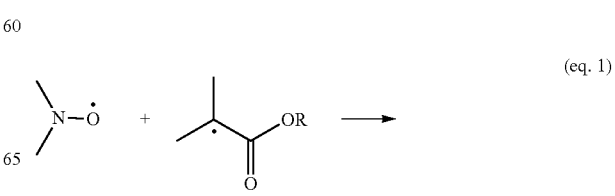

(eq. 1)

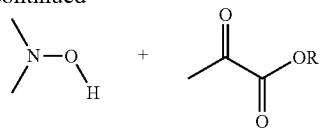

However, starting from a first block controlled by the nitroxide, it is possible to reinitiate a radical methacrylate polymerization, which will be limited in its living nature but will still result in a block copolymer.

The limitations of the living nature are reflected by a broadening of the polydispersity of the copolymer block, of between 1.5 and 2.5, and the Applicant Company has discovered that this had an effect on the morphology of the block copolymer.

This is because monodisperse block copolymers will experience transitions in morphology for copolymer block compositions which are very specific (cf. G. Holden et al. in "Thermoplastic elastomers", 2nd edition, Carl Hanser Verlag, Munich, Vienna, New York, 1996). For this reason, when the proportion of the thermoplastic block increases, the morphology changes towards a topology where the continuous phase is the thermoplastic phase.

As long as this situation is not reached, the block copolymer cannot be homogeneously blended with a matrix compatible with the thermoplastic block. For this reason, the blend becomes opaque and the mechanical properties thereof are very poor.

As the two-stage synthesis according to any one process for the polymerization (mass, solvent, emulsion, suspension) of copolymer block in the presence of nitroxides is very simple to carry out, it was essential to find the compositions or the methods of synthesis which result in copolymers which can be compatibilized with thermoplastic matrices. The Applicant Company has discovered that, for compositions comprising between 50% and 95% of thermoplastic phase, preferably between 60% and 85% of thermoplastic phase, the morphology of the copolymers obtained by controlled radical polymerization in the presence of nitroxides was compatible with a good mixture of the copolymer in brittle thermoplastic matrices.

Furthermore, unlike the document JP2000198825 A 20000718, in which the authors claim the use of block copolymers obtained by controlled radical polymerization in the presence of copper salt with a low polydispersity index (PI<1.5), the Applicant Company has found that, by virtue of the controlled radical polymerization in the presence of nitroxide, the polymerization of the thermoplastic block could take place at the same time as the polymerization of the matrix and that it was not necessary to isolate the block copolymer beforehand. Thus, starting from a first block functionalized by nitroxides, it is possible to initiate thermoplastic chains at the same time as other chains are initiated by conventional initiators or by thermal initiation. There are two advantages to this:

1—If the thermoplastic matrix to be reinforced against impact has the same composition as the thermoplastic block of the copolymer, the reinforced material is obtained directly.

2—If another matrix has to be reinforced, the fact of adding homopolymers to the block copolymer makes it possible to fluidify the copolymer, which, if not, exhibits too excessive a viscosity to be converted by extrusion without undergoing decomposition.

Applicant thus claims a process for the manufacture of block copolymers which are compatible with thermoplastic matrices and the use of these block copolymers in the manufacture of these resins which are more resistant to impact.

In particular, the process according to the invention consists of the synthesis of the copolymers in the presence of nitroxides (III):

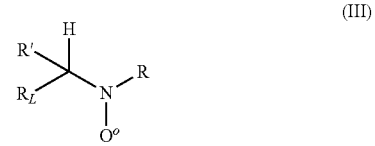

where R' and R, which are identical or different, optionally connected so as to form a ring, are alkyl groups having between 1 and 40 carbon atoms optionally substituted by hydroxyl, alkoxy or amino groups; in particular, R and R' will be tert-butyl groups;

and where $R_L$ is a monovalent group with a molar mass of greater than 16 g/mol; in particular, $R_L$ will be a phosphorus group and more particularly a phosphonate group of formula:

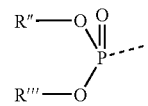

where R" and R'", which are identical or different, optionally connected so as to form a ring, are alkyl groups having between 1 and 40 carbon atoms optionally substituted by hydroxyl, alkoxy or amino groups; in particular R" and R'" will be ethyl groups.

In particular, the block copolymers are of general formula $B\text{-}(A)_n$, where B represents a polymer block composed of the sequence of monomer units which can be polymerized by the radical route in the presence of nitroxides (III) and for which the overall Tg is less than 0° C. The average molar mass of the block B is between 3000 g/mol and $10^6$ g/mol, preferably between 5000 g/mol and 200 000 g/mol and preferably between 5000 and 100 000 g/mol;

A is a block of the polymer composed of a sequence of monomer units which can be polymerized by the radical route in the presence of nitroxides (III) and for which the overall Tg is greater than 0° C. The average molar mass of each block A is between 10 000 g/mol and $10^6$ g/mol, preferably between 10 000 g/mol and 200 000 g/mol and preferably between 20 000 and 100 000 g/mol, where n is a natural number greater than two, preferably of between 2 and 20 and preferably between 2 and 8.

The relative lengths of the blocks A and B are chosen such that $n*Mn(A)/(n*Mn(A)+Mn(B))$ is between 0.5 and 0.95, preferably between 0.6 and 0.8, and such that Mn(B) is greater than or equal to the mean entanglement length of the block B. The polydispersity of the block copolymer obtained is between 1.5 and 3, preferably between 1.8 and 2.7 and more preferably from 1.9 to 2.5.

The process is characterized in that it consists:

1) firstly, in preparing, according to a conventional polymerization recipe, the first block B by mixing the monomer(s) with an alkoxyamine of general formula (IV):

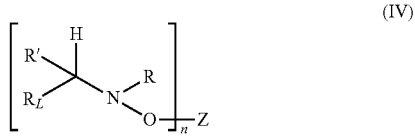

(IV)

where Z is a polyvalent radical carrying terminal functional groups of styryl or acryloyl type, the other radicals having the same meanings as above, nitroxide (III) being added to the mixture in a proportion ranging from 0 to 20 mol % with respect to the moles of alkoxyamine functional groups (one alkoxyamine contributes n alkoxyamine functional groups).

The polymerization is carried out at temperatures ranging from 60 to 250° C., preferably from 90 to 160° C., for pressures ranging from 0.100 bar to 80 bar, preferably from 0.5 bar to 10 bar.

The polymerization has to be controlled and the latter will preferably be halted before 99% conversion, preferably before 90% conversion. The block B thus obtained is either used with the residual monomers or is purified from the monomers by distillation or washing and drying with a solvent which is immiscible with B and miscible with the monomers used.

2) Secondly, the process consists in diluting the first block B obtained in the mixture of monomers intended to form the blocks A. Between 0 and 100 molar equivalents of conventional radical polymerization initiator (of the Luperox™ or azo compound type, for example AZDN™) are added to this mixture. The choice of this ratio depends on the viscosity/impact-reinforcing compromise which it is desired to have.

The polymerization is carried out at temperatures ranging from 60 to 250° C., preferably from 90 to 160° C., for pressures ranging from 0.100 bar to 80 bar, preferably from 0.5 bar to 10 bar.

The conversion of the monomer varies from 10 to 100% and the polymer obtained is separated from the residual monomers by evaporation under vacuum at temperatures ranging up to 250° C. and preferably 200° C.

3) Thirdly,
  either the material obtained is extruded in the presence of the brittle matrix which it is desired to see reinforced against impact: mention may in particular be made of PMMA, polyesters of PET or PBT type, polystyrene, PVDF, polyamides, polycarbonates, PVC and the like. This extrusion stage can also involve other additives, in particular impact additives, such as those of the Durastrength™ or Metablend™ trade mark,
  or else the material obtained is diluted in a mixture of monomers which is itself subsequently polymerized. Mention may be made, for example, of styrene, MMA, epoxides, mixtures of diols and of diacid, or precursors of polyamides (lactam or mixtures, diamine, diacids),
  it is also possible to use the material as an impact-resistant resin without blending.

A person skilled in the art knows how to choose his monomers according to the block desired. Mention may be made, among the monomers chosen, pure or as a mixture, of acrylic monomers of general formula:

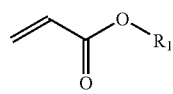

where $R^1$ is a hydrogen atom or a linear, cyclic or branched alkyl comprising from 1 to 40 carbon atoms which is optionally substituted by a halogen atom or a hydroxyl (—OH), alkoxy, cyano, amino or epoxy group.

Another family of monomers of choice is composed of methacrylic monomers of general formula:

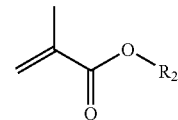

where $R_2$ has the same meaning as $R_1$.

Another possible monomer is acrylonitrile, styrene derivatives, dienes and generally any monomer carrying a vinyl bond which can be polymerized by the radical route.

The materials of the invention can be used in various fields, such as the automobile industry or the construction industry. They make it possible to manufacture impact-resistant shaped articles, in particular sheets, and very particularly sheets of use in forming thermoformed bathroom fittings, such as bath tubs, sinks, shower trays, basins, shower stalls and the like.

These shaped articles exhibit an improved impact strength while retaining good mechanical properties, in particular with regard to flexion (high modulus), that is to say a degree of stiffness.

The following examples illustrate the invention without limiting the scope thereof.

EXAMPLES

The stable free radical used in the examples and referenced SG1 corresponds to the following formula:

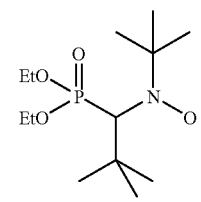

The alkoxyamines DIAMS and TRIAMS mentioned in the examples correspond to the following formulae:

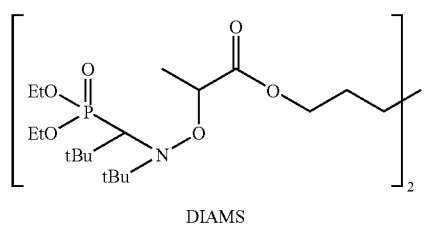

DIAMS

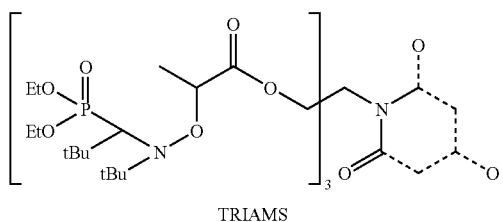

TRIAMS

I. First Series: Reinforcement Against Impacts of a PMMA Matrix by a B-(A)$_n$ Copolymer with n=2 or 3

I.1 Preparation of the Copolymers:

The general procedure for syntheses and for characterizations is described below.

The syntheses are carried out in two stages in a steel reactor with a working capacity of 9 liters. The starting media are systematically degassed by vacuum/nitrogen cycles before being introduced into the reactor, which is preheated to the reaction temperature.

The control of the polymerization of butyl acrylate, for example, in the presence of the alkoxyamines 1 or 2 denoted respectively by DIAMS and TRIAMS was optimized at a temperature T=115° C. and in the presence of an excess of free SG1 of 7 mol % per alkoxyamine functional group. Conversion was limited to 50%, so as to retain a good living nature of the PBuA-SG1 macroinitiators obtained, the residual monomer subsequently being removed by a stripping stage (70° C. under vacuum for 2 hours). In a second stage, the di- or trifunctional macroinitiators thus obtained were allowed to reinitiate the polymerization of MMA at 120° C. under pressure, so as to prepare triblock and star block copolymers. It is important to note that the conversion of MMA is limited because of disproportionation reactions between the nitroxide and the growing chains. Starting from synthesis No. 2, a rise in temperature in stationary phases between 85 and 120° C. was opted for, which made it possible to push back this limit from 20 to 45%.

The operating conditions for the syntheses of the block B functionalized with a stable free radical, SG1, are summarized in table 1 (Tab 1).

The operating conditions relating to the preparation of 4 block copolymers, poly(butyl acrylate) for block B and poly (methyl methacrylate) for block A, are summarized in table 2.

TABLE 2

Syntheses of the PBuA-SG1 copolymers

| | PBuA-SG1 | | MMA | | Ethylbenzene | | Mn |
|---|---|---|---|---|---|---|---|
| | w (g) | C (mol/l) | w (g) | C (mol/l) | w (g) | C (mol/l) | (f = 1) (PMMA) |
| FLOPIL6 | 1800 | 9.81 × 10$^{-3}$ | 6250 | 7.16 | 1780 (20%) | 1.92 | 73 000 |
| FLOPIL7 | 1800 | 1.29 × 10$^{-3}$ | 6420 | 8.21 | 830 (10%) | 1.00 | 64 000 |
| FLOPIL8 | 1100 | 5.31 × 10$^{-3}$ | 6750 | 8.25 | 840 (10%) | 0.97 | 155 200 |
| FLOPIL9 | 1100 | 3.23 × 10$^{-3}$ | 6750 | 8.25 | 840 (10%) | 0.97 | 245 500 |

I.2 Preparation of the Reinforced Matrix:

The blends composed of PMMA and of copolymers which reinforce against impacts are prepared by melt extrusion.

I.3 Characterizations

The molar masses and their distribution were determined by steric exclusion chromatography (SEC), by universal calibration using polystyrene standards and the Mark-Houwink coefficients of PBuA for the PBuA-SG1 macroinitiators and of PMMA for the copolymers.

The composition of the copolymers in PBuA and PMMA was determined by proton NMR. The results obtained are given in table 3 (Tab 3) as regards the block B and in table 4 (Tab 4) as regards the copolymers.

TABLE 3

Characteristics of the macroinitiators

| | BuA conversion % | Mn (theoretical) (g/mol) | Mn (SEC) (g/mol) | Mw (SEC) (g/mol) | PI |
|---|---|---|---|---|---|
| PBuA-FLOPIL6 | 35 | 21 000 | 21 000 | 31 700 | 1.50 |
| PBuA-FLOPIL7 | 50 | 30 000 | 17 800 | 55 400 | 3.11 |
| PBuA-FLOPIL8 | 47 | 28 200 | 25 300 | 35 000 | 1.38 |

TABLE 1

Synthesis of PBuA-SG1 macroinitiators

| | DIAMS/TRIAMS* | | SG1 | | BuA | | |
|---|---|---|---|---|---|---|---|
| | w (g) | C (mol/l) | w (g) | C (mol/l) | w (g) | C (mol/l) | Mn (th) |
| PBuAFLOPIL6 (DIAMS) | 59.7073 | 1.49 × 10$^{-2}$ | 3.1907 | 2.09 × 10$^{-3}$ | 3600 | 6.98 | 60 000 |
| PBuAFLOPIL7 (DIAMS) | 58.0488 | 1.49 × 10$^{-2}$ | 2.7919 | 2.09 × 10$^{-3}$ | 3500 | 6.98 | 60 000 |
| PBuAFLOPIL8 (DIAMS) | 54.0488 | 1.49 × 10$^{-2}$ | 2.7919 | 2.09 × 10$^{-3}$ | 3500 | 6.98 | 60 000 |
| PBuAFLOPIL9 (TRIAMS) | 69.9200 | 0.99 × 10$^{-2}$ | 2.8716 | 2.09 × 10$^{-3}$ | 3600 | 6.98 | 90 000 |

TABLE 3-continued

Characteristics of the macroinitiators

|  | BuA conversion % | Mn (theoretical) (g/mol) | Mn (SEC) (g/mol) | Mw (SEC) (g/mol) | PI |
|---|---|---|---|---|---|
| PBuA-FLOPIL9 | 50 | 45 000 | 28 000 | 44 000 | 1.57 |

TABLE 4

Characteristics of the copolymers

|  | MMA conversion % | Mn (th) (g/mol) | Mn (SEC) (g/mol) | Mw (SEC) (g/mol) | PI | % PMMA by weight |
|---|---|---|---|---|---|---|
| FLOPIL 6 | 20 | 35 600 | 44 900 | 124 200 | 2.70 | 68 |
| FLOPIL 7 | 35 | 40 000 | 77 400 | 170 760 | 2.20 | 70 |
| FLOPIL 8 | 44 | 93 600 | 100 200 | 240 600 | 2.40 | 80 |
| FLOPIL 9 | 40 | 138 200 | 87 230 | 245 900 | 2.8 | 77 |

The mechanical properties were evaluated by the well-known traction-elongation test. The results are illustrated by FIG. 1.

II. Second Series: In Situ Preparation of a PMMA Reinforced Against Impacts by the Polymerization of a Methyl Methacrylate/Macroinitiator Based on Butyl Acrylate and on Styrene Mixture (Syrup), Either by the "Cast Sheet" Technique or Continuously II.1 Cast Sheet Stage 1:

Preparation of butyl acrylate/styrene (83/17) copolymer by polymerizing by up to 69% a mixture comprising 7.2 kg of butyl acrylate, 800 g of styrene, 51 g of TRIAMS and 1.5 g of free SG1. The copolymer is recovered by evaporation of the volatile components and then dissolution in 8 kg of methyl methacrylate.

The macroinitiator obtained exhibits the following characteristics: 17% by weight of styrene, Mn=70 000 g/mol, Mw=142 000 g/mol.

Stage 2:

The formulation of the methyl methacrylate syrup employed is as follows:

A variable concentration of macroinitiator obtained according to stage 1: either 2% or 5% or 7.5% or 10% or 20% by weight of the total weight of the mixture.
550 ppm of Luperox 331-80M.
0.2% by weight of the total weight of the mixture of maleic anhydride.
21 ppm of γ-terpinene.

The sheets are introduced into an oven and are heated at 90° C. for approximately 16 hours and, in postpolymerization, at 125° C. for 2 hours.

These examples show (see table 5, Tab 5) that the incorporation of a block copolymer in a PMMA matrix of cast sheet type contributes a significant reinforcement against impact which is greater than the best current commercial reference.

TABLE 5

RESULTS

| Amount of PBuA | Appearance | Haze | Residual MMA | Resilience* (in kJ · m$^2$) |
|---|---|---|---|---|
| 2% | +++ | 1.18 | 3.65% | 1.35 ± 0.06 |
| 5% | +++ | 1.59 | 3.32% | 1.78 ± 0.16 |
| 7.5% | +++ | 2.43 | 3.87% | 2.81 ± 0.18 |
| 10% | +++ | 3.52 | 3.45% | 3.62 ± 0.25 |
| 20% | +++ | 5.94 | 2.38% | 6.23 ± 0.25 |

+++: No bloom, no bubbles, translucent, glossy, smooth.
*The impact results were produced on notched test specimens with a non-instrument-controlled Charpy device and a 1 joule hammer and at a velocity of 2.9 m · s$^{-1}$. For reference, the resilience of an unreinforced cast sheet and that of a cast sheet of commercial impact grade were measured, which have values of 1.35 ± 0.03 kJ · mol$^{-1}$ and 1.59 ± 0.03 kJ · mol$^{-1}$ respectively.

They also illustrate the fact that the block copolymers obtained by virtue of the chemistry of the nitroxides of the invention can be introduced in situ during the polymerization of the matrix.

II.2 Continuous Polymerization

Use is made in this example of an arrangement composed of two reactors in cascade. One is maintained at −40° C. and is used to feed the second with polymerization syrup. The second reactor is the polymerization reactor proper. The polymerization temperature is greater than 160° C. The monomer syrup is introduced into the polymerization reactor with a flow rate of 8 kg/h. As soon as a level of solid of the order of 60% is obtained, the polymerization medium is pumped continuously to a degassing extruder at a temperature of 230° C. The material is granulated after cooling in a water vat.

The monomer syrup used is as follows (as proportion by weight):
Poly(butyl acrylate); it is the copolymer Flopil 9 described above: 15%.
Ethyl acrylate: 0.6%.
Di(tert-dodecyl) disulfide: 100 ppm.
Dodecyl mercaptan: 0.34%.
Luperox 531: 180 ppm.
The maximum polymerization temperature achieved is 178° C.
The granules obtained have the final composition:
82.5% PMMA
17.3% acrylate (butyl and ethyl)
0.2% residual MMA.
Mn=30 000 g/mol (PMMA standard)
Mw=85 000 g/mol (PMMA standard)

The measurements of the yield stress of a standard PMMA, of a PMMA reinforced against impacts and of the material prepared according to the invention, carried out by compressive tests on cylindrical test specimens according to Standard ISO 604, made it possible to derive the following values:
Standard PMMA (MC31): 130 MPa
PMMA reinforced against impacts (commercial product: M17T): 98 MPa
Reinforced PMMA according to the invention: 96 MPa.

The comparison of these results shows that the product according to the invention has a ductile behavior equivalent to a standard impact grade of PMMA.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

The invention claimed is:

1. A process for the preparation of a transparent and impact-resistant polymer material comprising a brittle matrix (I) having a glass transition temperature of greater than 0° C. in which is dispersed a block copolymer (II) of formula B-(A)$_n$, n being between 2 and 20, with a polydispersity of between 1.5 and 3, B being a polymer block with a glass transition temperature of less than 0° C. and with a polydispersity index of less than 2 and A being a polymer block with a glass transition temperature of greater than 0° C., A being compatible with the matrix, wherein the block copolymer (II) is obtained by controlled radical polymerization in the presence of a nitroxide, comprising (1) preparing the first block B by mixing the monomer(s) with an alkoxyamine of formula:

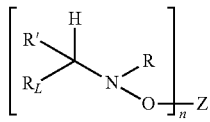

where R' and R, which are identical or different, optionally connected so as to form a ring, are alkyl groups having between 1 and 40 carbon atoms optionally substituted by hydroxyl, alkoxy or amino groups;

where R$_L$ is a monovalent group with a molar mass of greater than 16 g/mol; and where Z is a polyvalent radical carrying end functional groups of styrol or acryloyl, adding a nitroxide, and carrying out the polymerization at temperatures ranging from 60 to 250° C., pressures ranging from 0.100 bar to 80 bar, (2) diluting the first block B obtained in the mixture of monomers intended to form the block A compatible to the brittle matrix which is desired to see reinforced against impact, adding between 0 and 100 molar equivalents of a radical polymerization initiator, carrying out the polymerization at temperatures ranging from 60 to 250° C., and pressures ranging from 0.100 bar to 80 bar, the conversion of the monomer being from 10 to 100%, and separating the polymer obtained from the residual monomers by evaporation under vacuum at temperatures ranging up to 250° C., (3) mixing the product obtained in step (2) with the brittle matrix which it is desired to see reinforced against impact, optionally in the presence of other additives, and wherein the relative lengths of the first block B and the block A are selected such that n*Mn(A)/(n*Mn(A)+Mn(B)) is between 0.5 and 0.95, wherein, Mn(A) is the number-average molecular mass of the block A, Mn(B) is the number-average molecular mass of the first block B, and n is the number of polymer blocks A in the block copolymer obtained in step (2).

2. The method according to claim 1, wherein mixing the product is by extruding the product obtained in step (2) with the brittle matrix.

3. A process for the preparation of a transparent and impact-resistant polymer material comprising a brittle matrix (I) having a glass transition temperature of greater than 0° C. in which is dispersed a block copolymer (II) of formula B-(A)$_n$, n being between 2 and 20, with a polydispersity of between 1.5 and 3, B being a polymer block with a glass transition temperature of less than 0° C. and with a polydispersity index of less than 2 and A being a polymer block with a glass transition temperature of greater than 0° C., A being compatible with the matrix, wherein the block copolymer (II) is obtained by controlled radical polymerization in the presence of a nitroxide, comprising (1) preparing the first block B by mixing the monomer(s) with an alkoxyamine of formula:

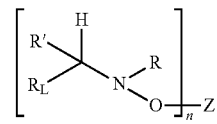

where R' and R, which are identical or different, optionally connected so as to form a ring, are alkyl groups having between 1 and 40 carbon atoms optionally substituted by hydroxyl, alkoxy or amino groups;

where R$_L$ is a monovalent group with a molar mass of greater than 16 g/mol; and where Z is a polyvalent radical carrying end functional groups of styrol or acryloyl, adding a nitroxide, and carrying out the polymerization at temperatures ranging from 60 to 250° C., pressures ranging from 0.100 bar to 80 bar, (2) diluting the first block B obtained in the mixture of monomers intended to form the block A compatible to the brittle matrix which is desired to see reinforced against impact, adding between 0 and 100 molar equivalents of a radical polymerization initiator, carrying out the polymerization at temperatures ranging from 60 to 250° C., and pressures ranging from 0.100 bar to 80 bar, the conversion of the monomer being from 10 to 100%, and separating the polymer obtained from the residual monomers by evaporation under vacuum at temperatures ranging up to 250° C., (3) diluting the product obtained step (2) in a mixture of monomers selected from the group consisting of styrene, MMA, epoxides, mixtures of diols and of diacid, or precursors of polyamides to obtain a diluted product and then polymerizing the diluted product; and wherein A represents from 50% to 95% by weight of the total weight of the block copolymer (II) and the number-average molar mass of A is between 10,000 to 10$^6$ g/mol.

4. A process for the preparation of a transparent and impact-resistant polymer material comprising a brittle matrix (I) having a glass transition temperature of greater than 0° C. in which is dispersed a block copolymer (II) of formula B-(A)$_n$, n being between 2 and 20, with a polydispersity of between 1.5 and 3, B being a polymer block with a glass transition temperature of less than 0° C. and with a polydispersity index of less than 2 and A being a polymer block with a glass transition temperature of greater than 0° C., A being compatible with the matrix, wherein the block copolymer (II) is obtained by controlled radical polymerization in the presence of a nitroxide, comprising (1) preparing the first block B by mixing the monomer(s) with an alkoxyamine of formula:

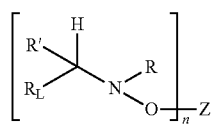

where R' and R, which are identical or different, optionally connected so as to form a ring, are alkyl groups having between 1 and 40 carbon atoms optionally substituted by hydroxyl, alkoxy or amino groups;
where $R_L$ is a monovalent group with a molar mass of greater than 16 g/mol; and
where Z is a polyvalent radical carrying end functional groups of styrol or acryloyl,
adding a nitroxide, and
carrying out the polymerization at temperatures ranging from 60 to 250° C., pressures ranging from 0.100 bar to 80 bar,
(2) diluting the first block B obtained in the mixture of monomers intended to form the block A compatible to the brittle matrix which is desired to see reinforced against impact,
adding between 0 and 100 molar equivalents of a radical polymerization initiator,
carrying out the polymerization at temperatures ranging from 60 to 250° C., and pressures ranging from 0.100 bar to 80 bar, the conversion of the monomer being from 10 to 100%, and
separating the polymer obtained from the residual monomers by evaporation under vacuum at temperatures ranging up to 250° C.,
(3) diluting the product obtained step (2) in a mixture of monomers selected from the group consisting of styrene, MMA, epoxides, mixtures of diols and of diacid, or precursors of polyamides to obtain a diluted product and then polymerizing the diluted product, and
wherein the relative lengths of the first block B and the block A are selected such that n*Mn(A)/(n*Mn(A)+Mn(B)) is between 0.5 and 0.95, wherein, Mn(A) is the number-average molecular mass of the block A, Mn(B) is the number-average molecular mass of the first block B, and n is the number of polymer blocks A in the block copolymer obtained in step (2).

5. A process for the preparation of a transparent and impact-resistant polymer material comprising a brittle matrix (I) having a glass transition temperature of greater than 0° C. in which is dispersed a block copolymer (II) of formula B-(A)$_n$, n being between 2 and 20, with a polydispersity of between 1.5 and 3, B being a polymer block with a glass transition temperature of less than 0° C. and with a polydispersity index of less than 2 and A being a polymer block with a glass transition temperature of greater than 0° C., A being compatible with the matrix, wherein the block copolymer (II) is obtained by controlled radical polymerization in the presence of a nitroxide, comprising
(1) preparing the first block B by mixing the monomer(s) with an alkoxyamine of formula:

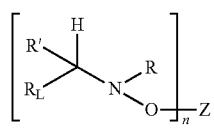

where R' and R, which are identical or different, optionally connected so as to form a ring, are alkyl groups having between 1 and 40 carbon atoms optionally substituted by hydroxyl, alkoxy or amino groups;
where $R_L$ is a monovalent group with a molar mass of greater than 16 g/mol; and
where Z is a polyvalent radical carrying end functional groups of styrol or acryloyl,
adding a nitroxide, and
carrying out the polymerization at temperatures ranging from 60 to 250° C., pressures ranging from 0.100 bar to 80 bar,
(2) diluting the first block B obtained in the mixture of monomers intended to form the block A compatible to the brittle matrix which is desired to see reinforced against impact,
adding between 0 and 100 molar equivalents of a radical polymerization initiator,
carrying out the polymerization at temperatures ranging from 60 to 250° C., and pressures ranging from 0.100 bar to 80 bar, the conversion of the monomer being from 10 to 100%, and
separating the polymer obtained from the residual monomers by evaporation under vacuum at temperatures ranging up to 250° C.,
(3) mixing the product obtained in step (2) with the brittle matrix which it is desired to see reinforced against impact, optionally in the presence of other additives; and
wherein A represents from 50% to 95% by weight of the total weight of the block copolymer (II) and the number-average molar mass of A is between 10,000 to $10^6$ g/mol.

6. The process as claimed in claim 5, wherein the alkoxyamine used corresponds to the following formula:

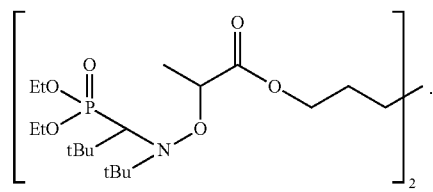

7. The process as claimed in claim 5, wherein the alkoxyamine used corresponds to the formula:

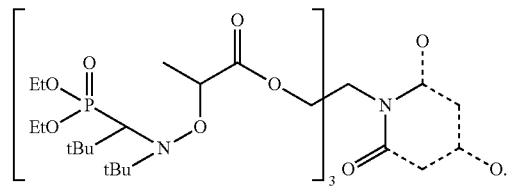

8. The process as claimed in claim 5, wherein the polydispersity is between 2 and 2.5.

9. The process as claimed in claim 5, wherein the block B exhibits a number-average molar mass of greater than 5000 g/mol.

10. The process as claimed in claim 9, wherein the number-average molar mass of block B is greater than 20,000 g/mol.

11. The process as claimed in claim 9, wherein the number-average molar mass of block B is greater than 60,000 g/mol.

12. The process as claimed in claim 5, wherein the polymerization temperature in step (1) is from 90 to 160° C. and the pressure is from 0.5 bar to 10 bar, the polymerization temperature in step (2) is from 90 to 160° C. and the pressure is from 0.5 bar to 10 bar, and the evaporization temperature is 200° C.

13. The process as claimed in claim 5, wherein R and R' are tert-butyl groups.

14. The process as claimed in claim 5, wherein $R_L$ is a phosphorus group or a phosphonate group of formula:

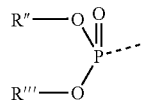

where R" and R'", which are identical or different, optionally connected so as to form a ring, are alkyl groups having between 1 and 40 carbon atoms optionally substituted by hydroxyl, alkoxy or amino groups.

15. The process of claim 14, wherein R" and R'" are ethyl groups.

16. The process as claimed in claim 5, wherein the brittle matrix is selected from the group consisting of PMMA, polyesters of PET or PBT, polystyrene, PVDF, polyamides, polycarbonates and PVC.

17. The process as claimed in claim 5, wherein the additives include a second impact modifier.

18. The process according to claim 17, wherein the impact modifier is an acrylic impact modifier.

19. The process as claimed in claim 5, wherein the block copolymer has a polydispersity of between 1.8 and 2.7.

20. The process as claimed in claim 5, wherein the proportion of brittle matrix is between 10 and 85%.

21. The process as claimed in claim 5, wherein the brittle matrix is greater than 50% by weight of at least one polymer selected from the group consisting of poly(methyl methacrylate), polystyrene, poly(vinylidene fluoride), polyesters, polycarbonate, poly(vinyl chloride), polyamide, polyepoxides, polyethylene, polyacrylonitrile and their copolymers.

22. The method according to claim 5, wherein mixing the product is by extruding the product obtained in step (2) with the brittle matrix.

* * * * *